(12) United States Patent
Abrink et al.

(10) Patent No.: US 8,647,207 B2
(45) Date of Patent: Feb. 11, 2014

(54) INFORMATION UPDATING MANAGEMENT IN A GAMING SYSTEM

(75) Inventors: Ulf Abrink, Stockholm (SE); Jens Gustav Nilsson, Stockholm (SE); Hakan Andersson, Stockholm (SE)

(73) Assignee: Aristocrat Technologies Australia Pty Limited (AU)

( * ) Notice: Subject to any disclaimer, the term of this patent is extended or adjusted under 35 U.S.C. 154(b) by 1525 days.

(21) Appl. No.: 11/830,514

(22) Filed: Jul. 30, 2007

(65) Prior Publication Data

US 2008/0039208 A1 Feb. 14, 2008

(30) Foreign Application Priority Data

Jul. 31, 2006 (SE) ..................................... 0601620

(51) Int. Cl.
*G06F 17/00* (2006.01)
(52) U.S. Cl.
USPC ............................................. 463/42; 463/40
(58) Field of Classification Search
USPC ................................................... 463/42, 40
See application file for complete search history.

(56) References Cited

U.S. PATENT DOCUMENTS

| 2004/0235563 | A1 | 11/2004 | Blackburn et al. | |
| 2005/0192099 | A1* | 9/2005 | Nguyen et al. | 463/42 |

* cited by examiner

*Primary Examiner* — Michael Cuff
(74) *Attorney, Agent, or Firm* — McAndrews, Held & Malloy, Ltd.

(57) ABSTRACT

Updating information in a client-server based gaming system comprising a client gaming machine, a game application server and a central database, by: storing in said central database login information for gaming system units that are logged in to the gaming system; storing updated information in the central database; storing an information update control command comprising an indication of the updated information and an indication of a receiver gaming system unit in the central database; generating an update command message comprising an update command for execution of an update operation in the receiver gaming system unit; determining the communication route to the receiver gaming system unit dependent on the stored login information; communicating the update command message to the receiver gaming system unit dependent on the determined communication route; executing the update command comprised in the update command message in the receiver gaming system unit.

8 Claims, 4 Drawing Sheets

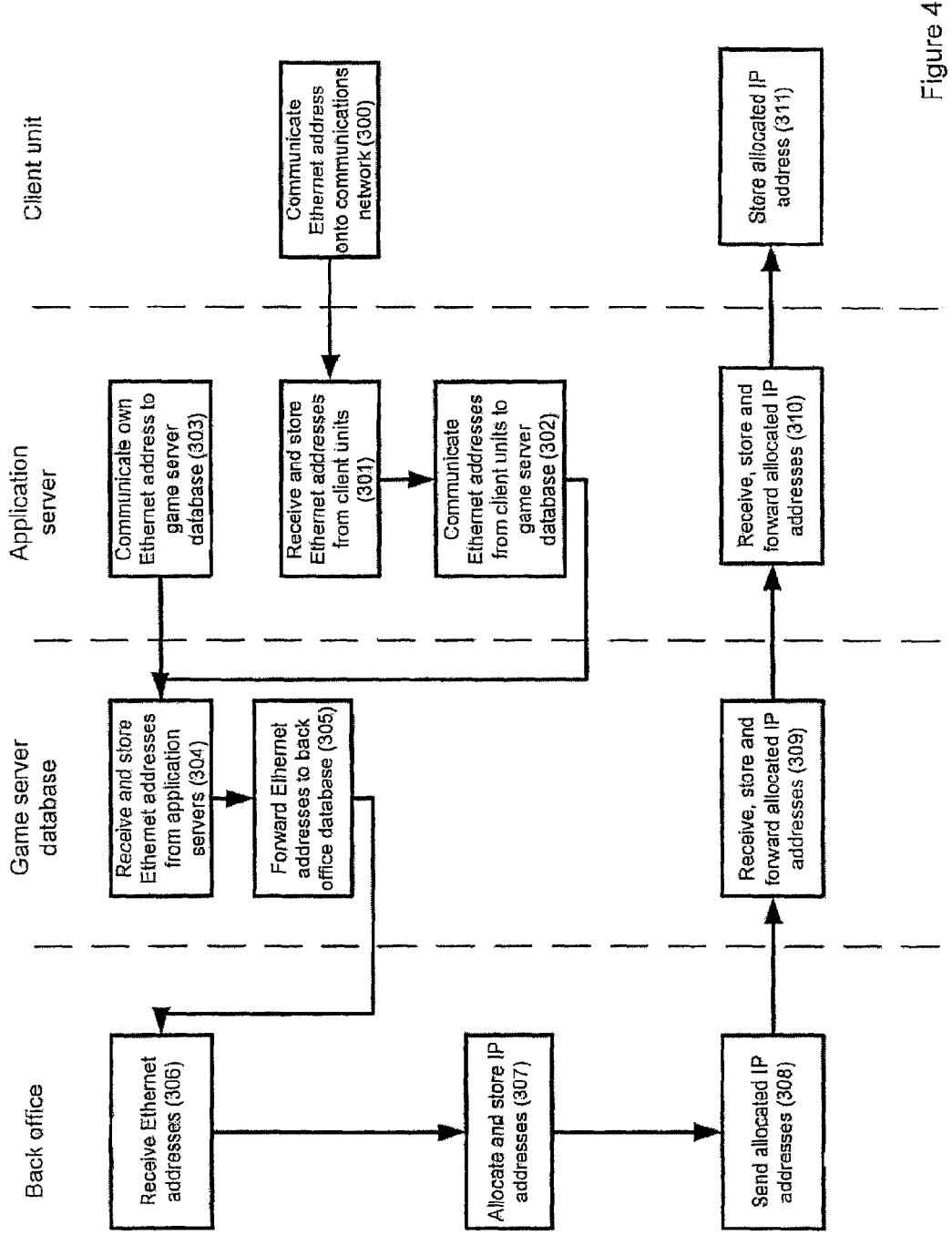

INFORMATION UPDATING MANAGEMENT IN A GAMING SYSTEM

RELATED APPLICATIONS

The present application relates to, and claims priority from, Swedish Patent Application No. 0601620-8, filed on Jul. 31, 2006, entitled "Information Updating Management in a Gaming System," which is herein incorporated by reference in its entirety.

TECHNICAL FIELD

The present invention relates in general to a gaming system, and more particularly to the updating of information in a gaming system. The gaming system includes one or more gaming machines, which provide a wagering game.

BACKGROUND

Computerized gaming systems for casino type games of chance have become more flexible and efficient with client-server based configurations where client gaming machines are connected to a central server and a central database in a data communications network. The different units forming the gaming system need updated information from time to time, and it is natural with this kind of architecture that updated information be distributed over the data communications network.

In recent game software architectures, the game software is modularised with a client game module in the client gaming machine and a server game module in a game application server that are both involved when a game is executed. This results in a tight coupling between different units of the gaming system and it is important that updates are put into effect as soon as possible in all affected units.

There is a requirement that the uptime for the gaming machines and other units in the gaming system should be affected as little as possible by updates while, at the same time, it is required that the information is updated with a minimum of delay. It is known to manage updating by making the gaming machines check for updated information on a regular basis. However, in order to maintain a system that is always updated, this requires checking to be performed frequently, which in turn affects the performance of the system as a whole. The data communications network is typically designed mainly with regard to the transaction frequency and the workload for the gaming applications, and there may be no large spare data transmission capacity dedicated for other data communication.

There is therefore a need for an efficient information updating method that affects the gaming applications to a minimum and that operates smoothly within a neatly dimensioned data communication network. It is an object of the invention to satisfy this need, or at least to provide an alternative to current gaming systems and methods of updating gaming system that is of utility.

RELATED ART

The present invention makes use of systems and methods disclosed in the co-pending but not yet published patent application no PCT/SE2006/000559 and the international patent publication WO2006/052213 by the same applicant as the one for the present application. The content of PCT/SE2006/000559 and WO2006052213 is herewith incorporated by reference in the present application.

The patent publication US 2004/0235563 A1 shows according to its abstract a gaming services framework that comprises a set of services, protocols, XML schemas, and methods for providing gaming system functionality in a distributed, network based architecture. Systems and methods provide a service-oriented framework for gaming and property management based upon internetworking technology and web services concepts. One aspect of the systems and methods includes a game update service that operates to publish service details, receive registration requests from gaming machines and other clients, and provides game update services to the gaming machines and other clients.

In more particular, the description describes that the gaming update service in various embodiments provides dynamic distribution of new or updated game content to gaming devices. In some embodiments, the gaming device subscribes to a game update event notification and can receive game updates via either a PUSH method or a PULL method. In the PUSH method when a game update is available, the service provider initiates the update process with the gaming device to download a new game. In the PULL method the service provider sends an event notification to the gaming device informing it that an update is available. The gaming device then initiates the game update by sending a request for the new game to the service provider. This piece of prior art requires the publishing of an available update service to gaming machines and a subscription in the shape of a registration for the update service from the gaming machine.

Any reference in this specification to the prior art does not constitute, nor should it be considered, an admission that such prior art was widely known or forms part of the common general knowledge in any jurisdiction, before the priority date of any of the appended claims.

SUMMARY OF THE INVENTION

Broadly, certain embodiments of the present invention relate to the use of log-in information stored in a central database to send properly addressed push messages to game system clients that should be updated with regard to content, such as display information or game software, and settings. In an embodiment of the invention the push messages comprise one or more commands to the receiving game system clients for predetermined types of updates. The game system clients are devised to execute the commands and thus perform updates in response to the received command messages. In certain embodiments, the updated information is stored in the central database and is read by the receiving game system units.

According to an aspect of the invention, a method is provided for updating information in a client-server based gaming system comprising a client gaming machine, a game application server and a central database. The method comprises the steps of:

storing in said central database login information for gaming system units that are logged in to the gaming system;

storing updated information in the central database;

storing an information update control command comprising an indication of the updated information and an indication of a receiver gaming system unit in the central database;

generating an update command message comprising an update command for execution of an update operation in the receiver gaming system unit;

determining the communication route to the receiver gaming system unit dependent on the stored login information;

communicating the update command message to the receiver gaming system unit dependent on the determined communication route;

executing the update command comprised in the update command message in the receiver gaming system unit.

In certain embodiments, the update command message comprises an indication of update information to be read from the central database; and the update command initiates, in the receiver unit, the execution of an operation to read updated information from the central database.

According to a further aspect of the invention, a system for updating information in a client-server based gaming system comprising a client gaming machine, a game application server and a central database, the system comprises:

a storage structure in said central database devised for storing login information for gaming system units that are logged in to the gaming system;

a storage structure in said central database devised for storing updated information;

a storage structure in said central database devised for storing an information update control command comprising an indication of the updated information and an indication of a receiver gaming system unit;

means for generating an update command message comprising an update command for execution of an update operation in the receiver gaming system unit;

means for determining the communication route to the receiver gaming system unit dependent on the stored login information;

means for communicating the update command message to the receiver gaming system unit dependent on the determined communication route;

means for executing the update command comprised in the update command message in the receiver gaming system unit.

In certain embodiments, the system further comprises means, in the receiver unit, for execution of an operation to read updated information from the central database in response to an update command.

According to a further aspect of the invention, a method for updating information in a client-server based network gaming system including a plurality of gaming system units arranged in a client-server architecture, comprises:

storing network address information for gaming system units that are connected to the gaming system;

determining dependent on the stored network address information the address of one or more receiver gaming system units to be updated, the one or more receiver gaming system units consisting of less than all of the gaming system units;

generating an update command message comprising an update command for execution of an update operation in the one or more receiver gaming system units, the update command comprising a command to adjust an operating parameter of the receiver gaming system unit and/or a command to download updated information from a specified source in the gaming system, the update command message including the determined address of the one or more receiver gaming system units;

communicating the update command message onto a network to which a plurality of servers of the gaming system are connected, and receiving the update command message at one of the plurality of servers as determined by the address in the update command message;

at the server, determining from the address in the update command message whether the server is a said receiver gaming system unit and if so, executing the command message at the server;

at the server, determining from the address in the update command message whether one or more clients of the server is a said receiver gaming system unit and if so, forwarding the command message to the one or more clients;

executing the update command comprised in the update command message in the one or more receiver gaming system units.

In certain embodiments, the server is a game application server in which critical gaming functions of one or more games provided by the gaming system are performed and wherein the one or more clients include at least one gaming machine terminal, at which a graphical user interface GUI and a user input interface function are implemented.

In certain embodiments, the server provides critical gaming functions to a plurality of gaming machine terminals.

In certain embodiments, there are a plurality of servers, that each provide critical gaming functions to a plurality of gaming machine terminals.

According to a further aspect of the invention a client-server based network gaming system including a plurality of gaming system units arranged in a client-server architecture comprises:

a database storing network address information for a plurality of gaming system units that are connected to the gaming system;

an electronic processing system associated with the database, which receives update information including an identification of one or more receiver gaming system units that consist of less than all of the gaming system units, stores the update information in the database and determines dependent on the stored network address information the address of the one or more receiver gaming system units, the electronic processing system including a network interface;

a plurality of servers that perform gaming functions for a plurality of clients including at least one gaming terminal, each server storing address information of the clients that it services, the plurality of servers communicably connected to the network interface of the electronic processing system over a network;

wherein the electronic processing system generates and sends over the network an update command message addressed to the one or more receiver gaming system units comprising an update command for execution of an update operation in the one or more receiver gaming system units, the update command comprising a command to adjust and operating parameter of the receiver gaming system unit and/or a command to download updated information from a specified location in the database;

wherein at least one of the plurality of servers receives the update command message dependent on the address in the update command message and dependent on the address in the update command message executes the command message and/or forwards the command message to the one or more clients for execution.

In certain embodiments, the server is a game application server in which critical gaming functions of one or more games provided by the gaming system are performed and wherein the one or more clients include at least one gaming machine terminal, at which a graphical user interface GUI and a user input interface function are implemented.

In certain embodiments, the server provides critical gaming functions to a plurality of gaming machine terminals.

In certain embodiments, there are a plurality of servers, that each provide critical gaming functions to a plurality of gaming machine terminals.

According to yet another aspect, the invention may be realised as computer program product comprising computer program code portions for directing the gaming system units to perform the above mentioned steps and functions.

Technical effects and advantages of certain embodiments of the present invention include elimination of a need for broadcasting update notifications as well as the need for on-site adjustments of clients, and enabling real-time update of content and settings from a centralized supervisory control site, for example.

BRIEF DESCRIPTION OF THE DRAWINGS

The invention is further explained by means of examples and in conjunction with the accompanying drawings, in which:

FIGS. 3 and 4 show flow diagrams of an update process and login process respectively, which may be performed within the gaming system shown in FIG. 1.

DETAILED DESCRIPTION OF CERTAIN EMBODIMENTS

The present invention relates to providing a technical solution for updating information in a gaming system. An aspect of the problem of providing such a technical solution may be identified as the achievement of targeted notification of updated content, such as display information or game software, and settings to game system clients in a gaming system with multiple servers and multiple databases.

The figures illustrate the configuration of a gaming system as well as a method and a computer program product for managing updating in accordance with certain embodiments of the invention. The described system, method steps and functions are realized by means of computer technology comprising data processors, memory means, data communications interfaces, control programs, input/output interfaces etc in a per se well known manner and the method described herein is an abstract description of a process performed by the aforementioned computer technology to implement certain embodiments of the present invention.

Different functions and features that are specific for certain embodiments of the present invention are preferably realised by means of specific combinations and configurations of hardware components and/or computer program code portions executed on data processing means, or by means of combinations thereof. It is within the knowledge of the skilled person to select appropriate means and combination of means for the realization of certain embodiments of the invention.

Figure 1:
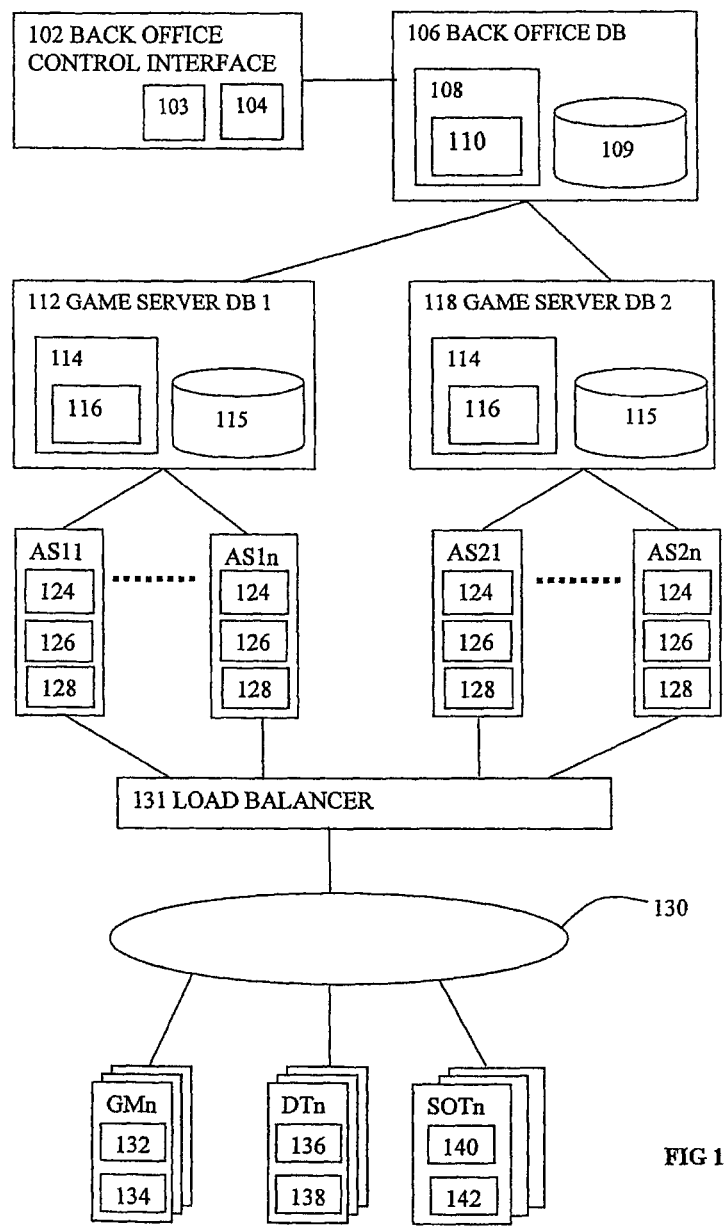
FIG. 1 shows an exemplifying embodiment of the invention realised in a client server configured gaming system with a multiple of servers and a multiple of databases.

FIG. 1 shows schematically an exemplifying embodiment of a client-server based gaming system 100 with an updating management system according to an embodiment of the invention. Those skilled in the relevant arts will appreciate that certain embodiments of the invention will also have application to other client-server gaming systems.

A back office control interface 102 is communicatively coupled to a back office database 106. A plurality of game server databases, here illustrated with a first game server database 112 and a second game server database 118, are communicatively coupled to the back office database 106. Each game server database 112, 118 is communicatively coupled to a plurality of game application servers, where a first group of game application servers AS11 to AS1$n$ are associated with the first game server database 112 and a second group of game application servers AS21 to AS2$n$ are associated with the second game server database 118.

A plurality of client gaming machines GMn, client display terminals DTn and client Site Operator Terminals SOTn are communicatively coupled or are able to be coupled to the game application servers AS11-As1$n$ and AS21-AS2$n$ via a data communications network 130 and optionally also via a load balancer 131 coupled to the game application servers. The symbol n denotes an arbitrary number 1, 2, 3 . . . n. The client gaming machines GMn, client display terminals DTn and client Site Operator Terminals SOTn are each referred to herein below as a 'client unit'. Different gaming system implementing the present invention may omit display terminals, and/or site operator terminals. The game server databases, game application servers and client units are each referred to herein below as a 'gaming system unit'.

In one configuration, each client unit is associated with a specific game application server and would normally always be coupled to the same game application server. In another configuration, each group of predetermined client units is associated with a specific group of game application servers and would normally always be directed to the same group of game application server. A load balancer may distribute load between game application servers in a group. An embodiment of the invention is further combined with a system for failover and takeover wherein the client units are coupled to selected game application servers or groups of game application servers according to predetermined rules and by means of the mentioned load balancer 131.

Communicatively coupled in this text means that there is provided a communication link over which information signals can be communicated between two coupled units, for example in the form of messages or data streams. The communication link can for example be continuously activated in an on-line state or be activated on request when a message, e.g. in the shape of a request or a response, is communicated.

The back office control interface 102 is in an embodiment implemented by means of a computer terminal with I/O means, for example a keyboard and point and click device, and a display device, and comprising computer software code that realizes a human-machine interface 103, which may be in the form of an image interface window that is displayed on the display, with fields for presentation of information, fields for entering information and fields for entering command signals. The back office control interface 102 comprises database access means 104, for example through a network interface card to an Ethernet connection or a suitable wireless connection, for accessing the back office database 106 with read and write instructions commanded via the interface window.

Updates of information as well as control commands for different gaming system units in the gaming system are entered via the back office control interface and are stored in the back office database 106, together with an indication of the identity of the destination gaming system units that are affected by or targets for the updates. Examples of information that may be subject to updating are game menus on gaming machines, attract movie sequences on gaming machines or on display terminals, or operational settings such as operating hours and game configuration. Examples of control commands that may be entered are enable or disable gaming system unit, shutdown or adjusting level of sound volume. Updating control command for controlling the distribution of updates dependent on pre-settable parameters are also entered to the back office database via the back office control interface.

The back office database 106 comprises a database application logic layer 108, a database storage structure 109 and a command message generator 110. The database storage structure 109 may be in the form of hard disk magnetic or optical storage units, and may also include CD-ROM drives or flash memory. The database application logic layer 108 may include any suitable software for forming database management server, for example the Oracle Database products, produced by Oracle Corporation.

Figure 2:
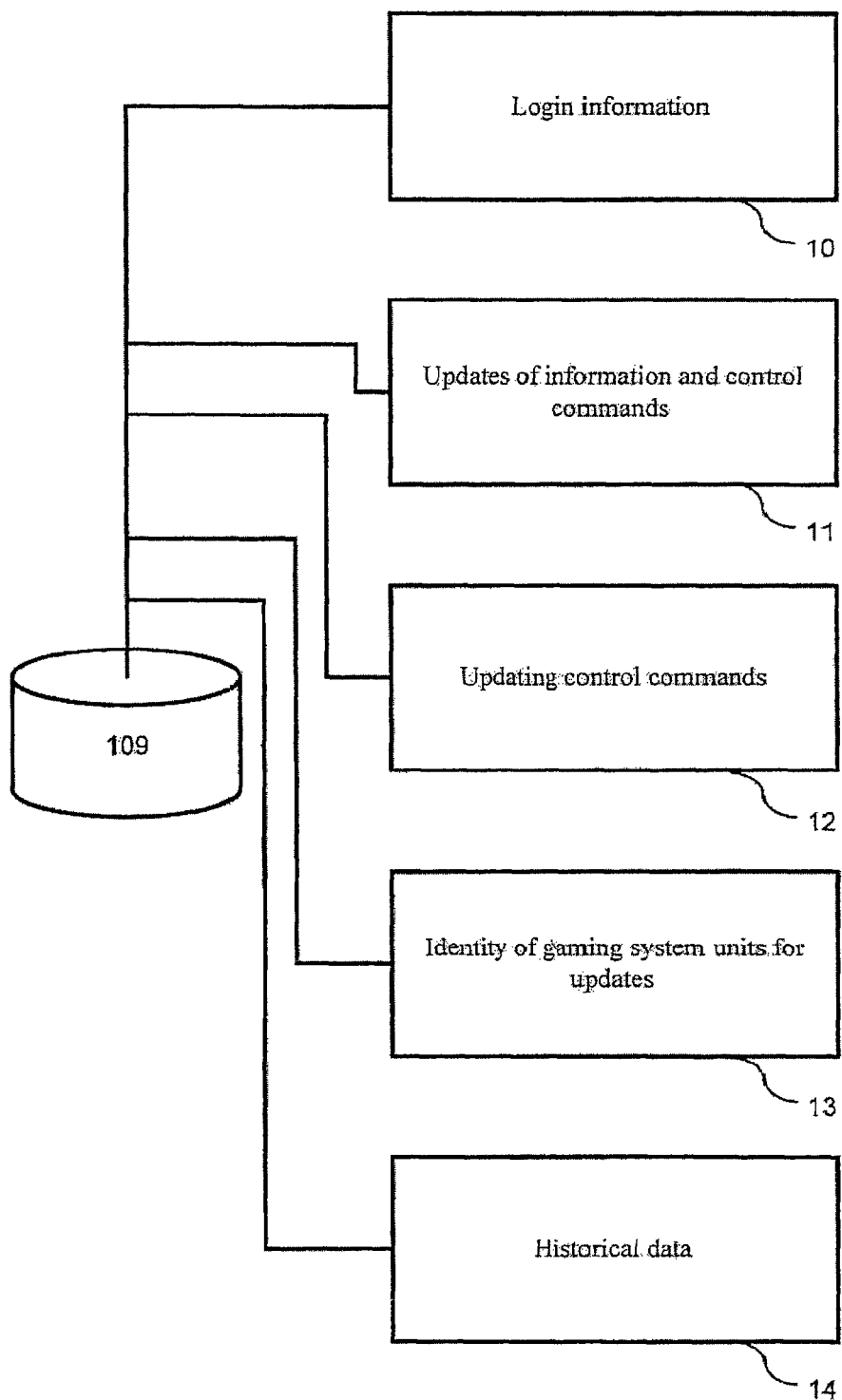
FIG. 2 shows diagrammatically some of the contents of a database in the gaming system of FIG. 1.

The information stored in the back office database storage structure 109 is shown in more detail in FIG. 2 and includes:

Login information 10. The login information 10 is information from the different gaming system units and includes indications of associated units, i.e. the identities and associations of the game server databases, game application servers, gaming machines and other client units such as the mentioned display terminal or site operator terminal.

Updates of information and control commands 11. The updates of information and control commands 11 for gaming system units are entered via the back office control interface 102.

Updating control commands 12. The updating control commands 12 are commands for controlling the distribution of updates, such as execute immediately or initiating updates dependent on predetermined event parameters or on predetermined time parameters.

Identity of the gaming system units for updates 13. Indications of the identity of the gaming system units that are affected by or targets for the updates are also stored in the database storage structure 109, for example in the form of a list of such identity indications for each update.

Historical data 14. Selections of historical data from game related and other transaction within the gaming system may also be stored n the database storage structure 109.

While a single database storage structure is shown in FIGS. 1 and 2, the back office database 106 may be implemented if required as a plurality of physically separate databases, each with its own database management server. A common indexing arrangement may be maintained.

The command message generator 110 generates and initiates the transmission of a push command message in response to and dependent on an update control command entered via the back office control interface. The push command message is generated with content dependent on the type of the destination gaming system unit. For each type of destination gaming system unit there is a predetermined type of message.

Each command message comprises a selection of:

An indication of the type of the receiving destination gaming system unit, e.g. game application server, gaming machine, display terminal or site operator terminal or other client terminal unit.

An addressee indication, that is an indication of the receiving destination gaming system unit. The addressee indication is taken from the 'identity of gaming system units for updates 13 information. This may be a specific addressee or a list of addresses.

A command for the receiving destination gaming system unit to execute, e.g. a command to obtain updated information by requesting or reading data from an identified source or to turn on or off a specific function.

A first identification indication, identifying a physical or logical destination unit where updated information is to be found.

A second identification indication, identifying the address of a set of data or a data file where updated information is to be found.

This information may be included in fields of one or more command packets that form the push command message.

The actual updated information is not included in the push command message, instead the message defines what type of information should be read from the back office database or from some other predetermined data storage unit. The receiving gaming system unit executes the current command to read or download the updated information and for example updates its setting in real time according to the command.

The command message generator 110 determines from login information in the back office data how the command message is to be sent to the defined receiver destination unit. The login information for example comprises an IP-address that is registered when the client unit logs in to the gaming system. By logging which game application server is used to log in a client unit there is information in the database that identifies to which game application server to send a push command message, for example by placing the address of the game application server in a header of packet(s) forming the push command message. In a preferred embodiment, the command message is then stored by operations of the back office database application layer 108 in the game server database that is associated with the defined receiver destination unit. The back office database 106 may directly communicate with the game server databases 112, 118 through dedicated communication channels, or through a network connection.

The game server databases 112, 118 each comprises a database application logic layer 114 and a database storage structure 115. The information stored in the game server database has a transactional nature and inter alia comprises information pertaining to game sessions, game session data, game session identity, client gaming machine identity, login information and configuration information updated as client units are logged on to the system and for example the game sessions are operated and executed. This information is preferably cached, i.e. temporarily stored, in the game server database 112, 118 and is continuously or intermittently transmitted and stored in the back office database 106, and then deleted from the game server databases 112, 118.

The database application logic layer 114 further comprises a push message manager 116 with a push message sender. The push message manager 116 is devised to detect when a new command message or a record has been inserted into a command table stored in the game server database 112, 118 by the back office database 106 and to determine the destination unit, and if applicable the identity of the game application server via which the destination unit can be communicated with. The push message sender then sends the command message to the identified game application server where it is received by a push message receiver. In an advantageous embodiment the push message communication is realised by an interrupt controlled communication function, e.g. implemented by means of the product Oracle DBMS_Pipe package. The push message sender writes the command message to the interrupt controlled communication function and whereupon the command message is immediately sent over the communication line to the game application server. When the command message arrives at the game application server, an interrupt signal is generated and the push receiver reads the command message. No confirmation of received message is generated in this embodiment.

The game application servers AS11-AS1*n*,AS21-AS2*n* each comprises server gaming functions 124, a push message manager 126 and a message distributor 128.

The server gaming functions 124 comprises not specifically drawn components as described in the mentioned co-pending but not yet published patent application no PCT/SE2006/000559 and the published patent application WO2006/052213. In the game application server, a server game module is embedded behind an application program interface called herein server game API through which all communication of the server game module takes place. The server gaming functions 124 further comprises a server application program interface in short called herein server API through which communication with general server gaming functions from part of the server game API as well as from part of other server functions, and external communication takes place. These general server gaming functions are typically critical functions such as a random number generator, an account service function, a log service function, or other functions that beneficially are shared and used by different specific game application programs.

The server gaming functions 124 is provided with further server function modules, in the exemplifying embodiment more specifically comprising a client handler that is communicatively coupled to the server API. The client handler manages communications and specific functions of clients other than the specific game applications that are executed by the server game module. Communications with client units takes place via the server API and a similar client API provided in the client units.

The push message manager 126 comprises a push message receiver, which receives push command messages from the push message sender forming part of the push message manager 116 in the game server database 112, 118. In the above mentioned embodiment realised with an interrupt controlled communication function, an interrupt signal is generated when a message arrives and the push message receiver reads the command message immediately. The push message manager 126 then determines the type of the receiving destination gaming system unit (in short: receiver unit type) from the command message content.

If the receiver unit type is a game application server, the command in the command push message is read and the execution of the command is initiated.

The command message for game application servers comprises in different embodiments a selection of the update commands that triggers execution in the receiving game application server:

1. Clear Cache! The execution of this command triggers the game application server to clear its cache memory. This is for example used when a client unit has been moved to a different game application server. The previous game application server is the commanded to remove that client from its session cache.
2. Get Configuration! This command triggers the download of an updated configuration parameter.
3. Game Update! This command triggers downloading an updated game configuration from the back office database or from some other identified and addressed unit where update files are stored.
4. Get Configuration Module! This command triggers downloading an updated module configuration from the back office database or from some other identified and addressed unit where update files are stored.
5. Stop Server! The commands in points 5-8 are self descriptive and are used for maintenance mastered from the back office control interface.
6. Pause Server!
7. Resume Server!
8. State Dump! This command triggers the dump ad storage of a current state of the game application server.
9. Get Jackpot! This command triggers the download of jackpot information from a predetermined data source unit.

If the receiver unit type is one or a plurality of client units, the push message manager 126 initiates forwarding of the push command message to the addressee client unit or units. The game application server determines the connection on the network socket for that client unit in its session cache, retrieves the relevant data for communication from memory and the sends the information to the client unit on the existing network socket.

The message distributor 128 forwards the push command message or transforms it to a new message format with a content dependent on the original push command message and communicates it to the addressee client unit or units. In the communication of the push command message between the game application server and the addressee client unit, preferably the normal communications means between server and client is used comprising a confirmation of a received message. In the addressee client unit the command in the push command message is read and the command is executed.

The gaming system client units, in this exemplifying embodiment comprising client gaming machines GMn, client display terminals DTn and client Site Operator Terminals SOTn, each comprises a command message manager 132, 136, 140. The command message manager 132, 136, 140 comprises a command message receiver devised to receive the push command messages from the game application server, a command message reader devised to read the received command messages and a command initiator devised to initiate the execution of a command found in the push command message.

The client gaming machines GMn comprises client gaming functions 134 that in its turn comprises not specifically drawn components as described in the mentioned co-pending but not yet published patent application no PCT/SE2006/000559 and the published patent application WO2006052213. In the client gaming machines a client game module is embedded behind an application program interface called client game API through which all communication of the client game module takes place. The client gaming functions 134 further comprises a client application program interface in short called client API through which communication with general client gaming functions from the part of the client game API as well as from the part of other client functions and external communications takes place. The general client gaming functions installed on the client gaming machine are used by different client game modules.

The general client gaming functions are designed for assisting in implementing and executing a specific game on the client gaming machine and are available for the client game module. These general client gaming functions are in different embodiments a selection of a graphical user interface GUI, a cashbox function, a sound function, a user input interface function for example buttons, data storage, a printer, a bar code reader and other functions that are related to the performance of a game. The client game module is communicatively coupled to the corresponding server game module for communicating requests and responses in order to utilize the general gaming functions provided in the server. For each game a message protocol for communication between the client module and the server module is generated, the protocol is for example based on XML and is shared by the client and the server. The client gaming machine further comprises a client control module that controls communications and general functions of the client gaming machine other than the specific game applications and communicates via the client API.

The command message for client gaming machines comprises in different embodiments a selection of the update commands that triggers execution in the receiving client machine:

1. Update Game Configuration! The execution of this command triggers a request to the game application server for downloading an updated configuration file and possibly for downloading updated game files from the back office database or from some other identified and addressed unit where update files are stored.
2. Enable! This command triggers that the client gaming machine is enabled for gaming operations. This command can also be triggered from a site operator terminal coupled to the current client gaming machine.
3. Disable! This command triggers that the client gaming machine is disabled for gaming operations. This command can also be triggered from a site operator terminal coupled to the current client gaming machine.
4. Master Enable! This command from the back office control interface overrides any enable or disable commands from the site operator terminal.
5. Master Disable! This command from the back office control interface overrides any enable or disable commands from the site operator terminal.
6. Shutdown! This command triggers full shutdown of the client gaming machine hardware.
7. Update Music Volume! This command triggers an update and adjustment of the music volume according to a music control parameter for example comprised in the command or downloaded from a predetermined database table.
8. Status Request! This command triggers a response from the client gaming machine with request for updating a database table with predetermined status parameter values and a time stamp.
9. Update Operating Hours! This command triggers an update and adjustment of the operating hours when the client gaming machine is open for gaming operations according to an operating hours parameter for example comprised in the command or downloaded from a predetermined database table.
10. Update Adverts! This command triggers a request to the game application server for downloading updated advertisement content from the back office database or from some other identified and addressed unit where update files are stored.
11. Update SOT IP Address! This command triggers update of the IP address of the site operator terminal to which the client gaming machine should be associated and coupled with. The update is preferably downloaded from the back office database.
12. Update IVT Configuration! This command triggers update of the configuration of the client machine. The update is preferably downloaded from the back office database.

The client display terminals DTn further comprises display functions 138 devised to display predetermined video or image content stored in the client display terminal or received or read as a stream of data from some other gaming system unit.

The command message for client display terminals comprises in different embodiments a selection of the update commands that triggers execution in the receiving display terminal:

1. Enable! This command triggers that the client display terminal is enabled for displaying video or image content.
2. Disable! This command triggers that the site operator terminal is disabled for displaying video or image content.
3. Update Display Content! This command triggers a request to the game application server for downloading updated video or image content from some identified and addressed unit where display information is stored or generated.

The client site operator terminal SOTn further comprises site operator management functions devised to support site operator management, for example functions for monitoring status, properties or statistics of a group of client gaming machines at a venue and control management functions for controlling some predetermined controllable functions of the group of client gaming machines.

The command message for site operator terminals comprises in different embodiments a selection of the update commands that triggers execution in the receiving site operator:

1. Enable! This command triggers that the site operator terminal is enabled for monitoring and controlling an associated group of client gaming machines.
2. Disable! This command triggers that the site operator terminal is disabled for monitoring and control operations.
3. Update Operating Hours! This command triggers an update and adjustment of the operating hours when the site operator terminal is open for monitoring and controlling the associated group of gaming machines according to operating hours parameters for example comprised in the command or downloaded from a predetermined database table.
4. Update New Messages! This command triggers a request to the game application server for downloading updated messages from the back office database or from some other identified and addressed unit where update files are stored.
5. Status Request! This command triggers a response from the client site operator terminal with request for updating a database table with predetermined status parameter values and a time stamp.

Figure 3:
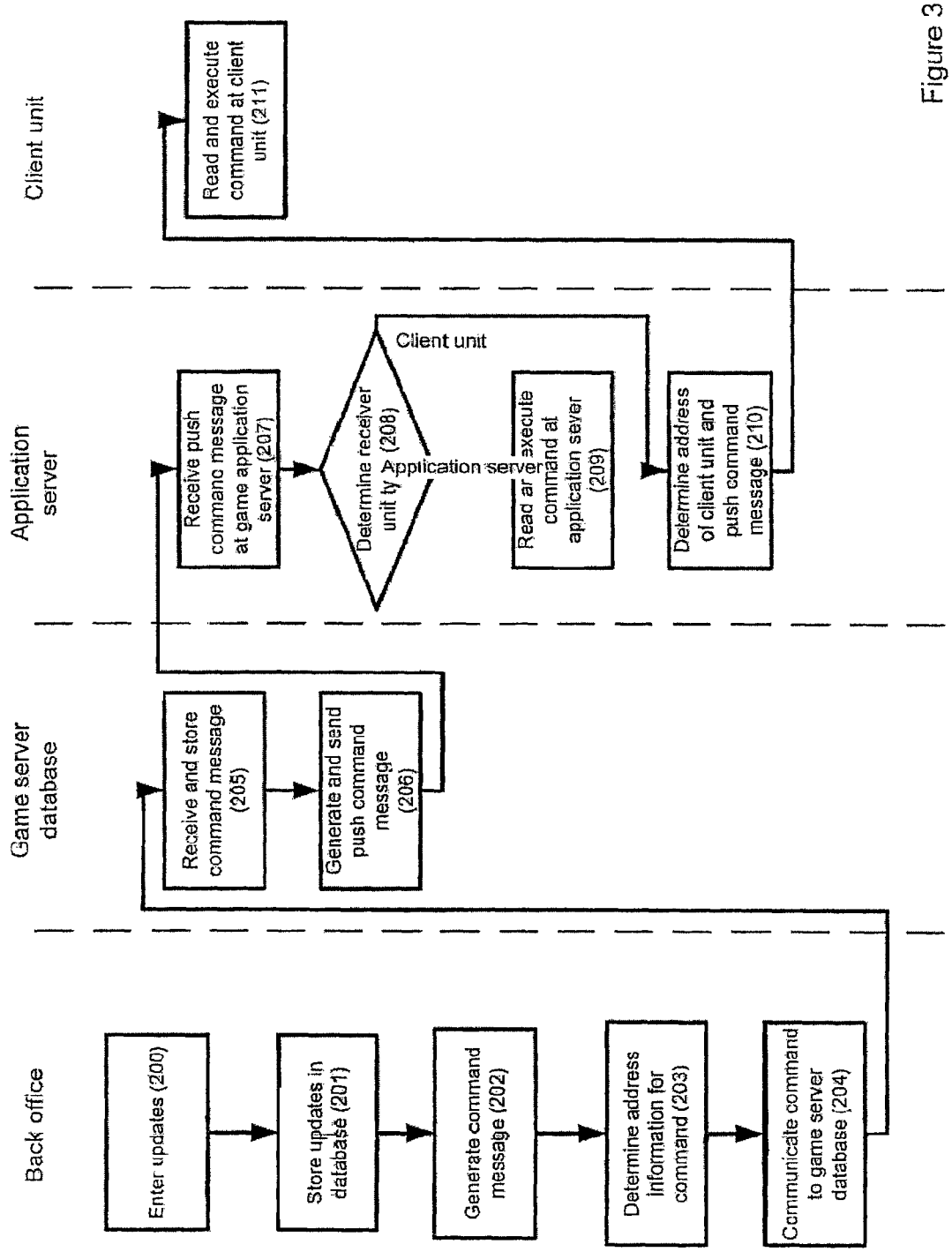

FIG. 3 shows schematically a flow chart of steps in an exemplifying embodiment of a method for updating management in a client-server based gaming system according to certain embodiments of the invention. The numbered list below and the arrangement of steps in FIG. 3 is merely for reference purpose and does not necessarily mean that the steps are performed in a sequence corresponding to the indicated numerical order.

At step 200, updates of information, such as updates of game files or settings, are entered via the back office control interface 102 using the human-machine interface 103. For example, the back office control interface 102 may allow parameters to be set using fields displayed to the operator and allow files to be marked for storage in the back office database 106. The files may be stored locally, available on removable storage such as a CD or a flash drive, or able to be downloaded through a network connection to a local or wide area network (not shown). The updates are entered together with an indication of the gaming system units that are affected by and therefore targets for the update.

At step 202, the updates are communicated from the back office control interface to the back office database 106 by the database access means 104, and caused to be stored in the database storage structure 109 of the back office database 106 by the database application logic layer 108.

At step 203, command message comprising commands for update operations is generated by command message generator 110 in the database application logic layer 108.

At step 204, it is determined from login information stored in the database storage structure 109 how the command message should be sent to the target receiver units. That is it is determined via which game server database 112, 118 and via which game application server the command message should be sent.

At step 205, the command message is sent by the back office database 106 under the control of the command message generator 110, for example by providing the message to an Ethernet network card for transmission onto an Ethernet cable.

At step 206, the command message is received and stored in the database storage structure 115 of the determined game server database 112, 118 under the control of the database application logic layer 114 of that game server database. The storage may suitably be in random access memory, which may if required be in the form of non-volatile random access memory, for example by being battery-backed.

At step 207, the database application logic layer 114 of the game server database 112, 118, in response to receipt of the command message, generates a push command message from the stored command and sends the command, for example by providing the command to a network card. The push command is addressed to the relevant game application server(s) dependent on the address information in the command.

At step 208, the push command message is received by the push message manager 126 of relevant game application server(s) and stored at the game application server for execution or pushing to a client unit.

At step 209, the push message manager 126 of the game application server determines the receiver unit type from the command message content.

At step 210, if the receiver unit type is a game application server, the game application server reads the command in the command message and the execution of the command is initiated.

At step 211, if the receiver unit type is a client unit, the message distributor 128 of the game application server determines communication data for the receiver client unit, which depending on the particular implementation of the gaming system 100 may be in a different communication format, and communicates the command message to the receiver client unit.

At step 212, the receiver client unit reads the command in the command message and the execution of the command is initiated.

The execution of the command generates the update of a local parameter or initiates download of updated information from the back office database or from some other indicated data storage unit.

The update is carried out in real time as soon as the update is first entered via the back office control interface. If a receiver unit is not logged in at the moment, the update command message is sent immediately upon login.

FIG. 4 shows a flow diagram of a process to generate the login information, in particular the process to allocate an IP address to each device in the gaming system 100. The actual address used, may depending on the size of the network may be an abbreviated address and other address allocation methods may be used. The flow diagram assumes an implementation in which the client units are connected to the application servers through an Ethernet network, the applications servers are similarly connected to the game server databases 112, 118 through an Ethernet network and the game server databases 112, 118 each have a direct communication line with the back office database 106. Those skilled in the relevant arts will appreciate that modifications to the method or alternative methods may be used, depending in part on the particular gaming system implemented. Again, the recitation of steps in a particular order below does not imply that the steps are performed in that order.

Each client unit, when connected to the data communications network 130, communicates an identifier onto the network for receipt by an application server. This identifier may be a hardware address such as an Ethernet address.

At step 300, the application server or group of applications servers determined by the load balancer 131 or otherwise to receive messages from the client unit, receives and stores the Ethernet address in memory.

At step 301, the application server communicates the Ethernet addresses to the game server database 112, 118 with which they are associated.

At step 302, the application server, which has its own Ethernet card, communicates its Ethernet address onto the Ethernet network for receipt by a game server database 112, 118.

At step 303, the game server databases 112, 118 receive the store the addresses of the application servers and client units.

At step 304, the game server databases 112, 118 forward the addresses to the back office database 106.

At step 305, the back office database 106 uses its database application logic layer 108 to receive the addresses of the application servers and client units.

At step 306, the database application logic layer 108 of the back office database 106 allocates IP addresses to each Ethernet address and maintains a list of addresses.

At step 307, the allocated addresses are communicated by the back office database to the game server databases 112, 118.

At step 308, the game server database 112, 118 receives, optionally stores and forwards the allocated IP addresses to the application servers.

At step 309, the application servers receive their own IP-addresses and store them for use in recognising communications to them on the Ethernet network. The application servers also store the IP addresses for each client unit that the server services and forwards the addresses on to those client units.

At step 310, the client units receive and store their allocated IP address.

The client units and application servers may then be interrogated or send information regarding their type to the back office database.

The invention has been described by way of exemplifying embodiments, but naturally there are various manners of realising the invention within the scope of the claims.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

Those skilled in the art will appreciate that the embodiments disclosed herein may be applied to the formation of any virtual machine computing system. Certain features of the embodiments of the claimed subject matter have been illustrated as described herein; however, many modifications, substitutions, changes and equivalents will now occur to those skilled in the art. Additionally, while several functional blocks and relations between them have been described in detail, it is contemplated by those of skill in the art that several of the operations may be performed without the use of the others, or additional functions or relationships between functions may be established and still be in accordance with the claimed subject matter. It is, therefore, to be understood that the appended claims are intended to cover all such modifications and changes as fall within the true spirit of the embodiments of the claimed subject matter.

The invention claimed is:

1. A method for updating information in a client-server based network gaming system including a plurality of gaming system units comprised of application servers and client gaming machines arranged in a client-server architecture, the method comprising:
   storing network address information for gaming system units that are connected in the gaming system;
   determining dependent on the stored network address information an address of one or more receiver gaming system units to be updated, the one or more receiver gaming system units consisting of less than all of the gaming system units;
   generating an update command message comprising:
      a control command having a field indicating whether the one or more receiver gaming system units are one of an application server or a client gaming machine; and wherein the client gaming machine are remote to the application servers and connected thereto via a data communications network; and
      an update command to download updated information from a specified source in the gaming system;
         and wherein the update command message further comprises the determined address of the one or more receiver gaming system units, and
         wherein the update command executes an update operation at the one or more receiver gaming system units;
   communicating the update command message via a network to a plurality of application servers, and receiving the update command message at one of the plurality of application servers as determined by the address in the update command message;
   at the application server, determining from the control command whether the application server itself is a said receiver gaming system unit;
   at the application server, determining from the control command message whether the one or more client gaming machines of the application server is a said receiver gaming system unit and if so, forwarding the update command to the one or more client gaming machines;
   executing the update command comprised in the update command message in the one or more receiver gaming system units.

2. The method of claim 1, wherein the server is a game application server in which critical gaming functions of one or more games provided by the gaming system are performed and wherein the one or more clients include at least one gaming machine terminal, at which a graphical user interface GUI and a user input interface function are implemented.

3. The method of claim 2, wherein the server provides critical gaming functions to a plurality of gaming machine terminals.

4. The method of claim 3, wherein there are a plurality of servers, that each provide critical gaming functions to a plurality of gaming machine terminals.

5. A client-server based network gaming system including a plurality of gaming system units arranged in a client-server architecture, the gaming system comprising:
   a database storing network address information for a plurality of gaming system units that are connected in the gaining system;
   an electronic processing system associated with the database, which receives update information including an identification of one or more receiver gaming system units that consist of less than all of the gaming system units, stores the update information in the database and determines dependent on the stored network address information an address of the one or more receiver gaming system units, the electronic processing system including a network interface;
   a plurality of application servers that perform gaming functions for a plurality of client gaming machines including at least one gaming terminal, each application server storing address information of the client gaming machines that it services, the plurality of application servers communicably connected to the network interface of the electronic processing system over a network;
   wherein the electronic processing system generates and sends over the network an update command message addressed to the one or more receiver gaming system units for execution of an update operation in the one or more receiver gaming system units, the update command message comprising:
      a control command having a field indicating whether the one or more receiver gaming system units are one of an application server or one of a client gaming machine; and wherein the client gaming machines are remote to the application server and connected thereto via a data communications network; and
      an update command to download updated information from a specified location in the database;
         wherein the update command message further comprises the determined address of the one or more receiver gaming system units, and
         wherein the update command executes an update operation at the one or more receiver gaming system units,
   wherein at least one of the plurality of application servers receives the update command message dependent on the address in the update command message when the application server itself is a said receiver gaming system unit, and dependent on the address in the update command message forwards the command message to the one or more client gaming machines for execution when the one or more client gaming machines of the application server is a said receiver gaming system unit, and the update command comprised in the update command message is executed in the one or more receiver gaming system units.

6. The gaming system of claim 5, wherein the server is a game application server in which critical gaming functions of one or more games provided by the gaming system are performed and wherein the one or more clients include at least one gaming machine terminal, at which a graphical user interface GUI and a user input interface function are implemented.

7. The gaming system of claim 6, wherein the server provides critical gaming functions to a plurality of gaming machine terminals.

8. The gaming system of claim 7, wherein there are a plurality of servers, that each provide critical gaming functions to a plurality of gaming machine terminals.

* * * * *